United States Patent
Hussain et al.

(10) Patent No.: US 10,660,100 B2
(45) Date of Patent: *May 19, 2020

(54) ROBUST DOWNLINK CONTROL INFORMATION WITH FLEXIBLE RESOURCE ASSIGNMENTS

(71) Applicant: Apple Inc., Cupertino, CA (US)

(72) Inventors: Awais M. Hussain, Milpitas, CA (US); Farouk Belghoul, Campbell, CA (US); Lydi Smaini, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,407

(22) Filed: Jul. 24, 2019

(65) Prior Publication Data

US 2019/0349935 A1 Nov. 14, 2019

Related U.S. Application Data

(63) Continuation of application No. 15/673,683, filed on Aug. 10, 2017, now Pat. No. 10,397,924.

(60) Provisional application No. 62/373,267, filed on Aug. 10, 2016.

(51) Int. Cl.
| | |
|---|---|
| *H04W 4/00* | (2018.01) |
| *H04W 72/04* | (2009.01) |
| *H04L 5/00* | (2006.01) |
| *H04L 1/00* | (2006.01) |
| *H04L 1/08* | (2006.01) |

(52) U.S. Cl.
CPC ....... *H04W 72/0453* (2013.01); *H04L 1/0001* (2013.01); *H04L 1/0072* (2013.01); *H04L 1/08* (2013.01); *H04L 5/0053* (2013.01); *H04L 5/0094* (2013.01); *H04W 72/042* (2013.01)

(58) Field of Classification Search
CPC ............ H04W 72/0453; H04W 72/042; H04L 1/0001; H04L 5/0094
USPC .......................................... 370/329, 342, 331
See application file for complete search history.

(56) References Cited

U.S. PATENT DOCUMENTS

| | | |
|---|---|---|
| 8,291,108 B2 | 10/2012 | Raja |
| 10,397,924 B2 * | 8/2019 | Hussain ................ H04L 5/0053 |
| 2015/0009939 A1 | 1/2015 | Zhang et al. |
| 2015/0085677 A1 | 3/2015 | Pourahmadi |
| 2015/0085717 A1 * | 3/2015 | Papasakellariou ........ H04L 5/14 370/280 |
| 2015/0092735 A1 | 4/2015 | Xu |

(Continued)

*Primary Examiner* — Marceau Milord
(74) *Attorney, Agent, or Firm* — Kowert Hood Munyon Rankin and Goetzel PC; Jeffrey C. Hood

(57) ABSTRACT

This disclosure relates to techniques for providing robust downlink control information with flexible resource assignments for wireless devices that operate in a restricted bandwidth compared to the system bandwidth. A base station may determine a resource assignment for a wireless device. The base station may transmit downlink control information to the wireless device. The downlink control information may include an indication of a resource assignment for the wireless device. The indication of the resource assignment may include an indication of a first narrowband associated with the resource assignment, and an indication of whether one or more additional narrowbands are associated with the resource assignment. The base station and the wireless device may communicate data according to the resource assignment.

20 Claims, 3 Drawing Sheets

(56) References Cited

U.S. PATENT DOCUMENTS

| | | |
|---|---|---|
| 2015/0103773 A1 | 4/2015 | Pedersen |
| 2015/0201383 A1 | 7/2015 | Papasakellariou |
| 2015/0296359 A1* | 10/2015 | Edge .................. H04W 72/048 |
| | | 455/404.2 |
| 2016/0044642 A1 | 2/2016 | Xu et al. |
| 2016/0100422 A1 | 4/2016 | Papasakellariou |
| 2016/0234730 A1 | 8/2016 | John |
| 2016/0337157 A1* | 11/2016 | Papasakellariou ..... H04B 3/232 |
| 2017/0064694 A1* | 3/2017 | Wang ................ H04W 72/1278 |
| 2017/0070994 A1 | 3/2017 | Rico Alvarino et al. |
| 2017/0099653 A1 | 4/2017 | Yoo |
| 2017/0264419 A1 | 9/2017 | Fakoorian |
| 2017/0265168 A1 | 9/2017 | Wang |
| 2017/0265187 A1* | 9/2017 | Chen ..................... H04W 76/14 |
| 2017/0346609 A1 | 11/2017 | Li |
| 2018/0020452 A1 | 1/2018 | Yerramalli |
| 2019/0274134 A1* | 9/2019 | Wang ................. H04W 72/044 |

\* cited by examiner

ROBUST DOWNLINK CONTROL INFORMATION WITH FLEXIBLE RESOURCE ASSIGNMENTS

PRIORITY INFORMATION

This application is a continuation of and claims priority to U.S. patent application Ser. No. 15/673,683, entitled "Robust Downlink Control Information with Flexible Resource Assignments," filed Aug. 10, 2017, which claims priority to U.S. provisional patent application Ser. No. 62/373,267, entitled "Robust Downlink Control Information with Flexible Resource Assignments," filed Aug. 10, 2016, each of which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to techniques for providing robust flexible resource assignments in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". Many such devices have relatively limited wireless communications capabilities and typically have smaller batteries than larger portable devices, such as smart phones and tablets. In general, it would be desirable to recognize and provide support for the relatively limited wireless communication capabilities of such devices. Therefore, improvements in the field are desired.

SUMMARY

Embodiments are presented herein of, inter alia, systems, apparatuses, and methods for providing robust flexible resource assignments in a wireless communication system.

Commonly, at different times, a wireless device may have different amounts of data to communicate. Such variable communication needs can occur at times when signal conditions are poor, and/or for devices with limited communication capabilities that may always benefit from coverage enhancement features. Accordingly, it may be desirable to support the capability to provide variable communication bandwidth allocations to wireless devices in a robust manner.

According to the techniques described herein, it may be possible to provide a variable amount of communication bandwidth to a wireless device at different times, and to signal such allocations in a robust manner. For example, a downlink control information format is described herein that can flexibly allocate different amounts of frequency resources at different times. Downlink control information formatted in such a way may be signaled on a downlink control channel that includes features for robust and/or coverage enhanced reception, such as repetition in time and/or frequency, among various possibilities.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
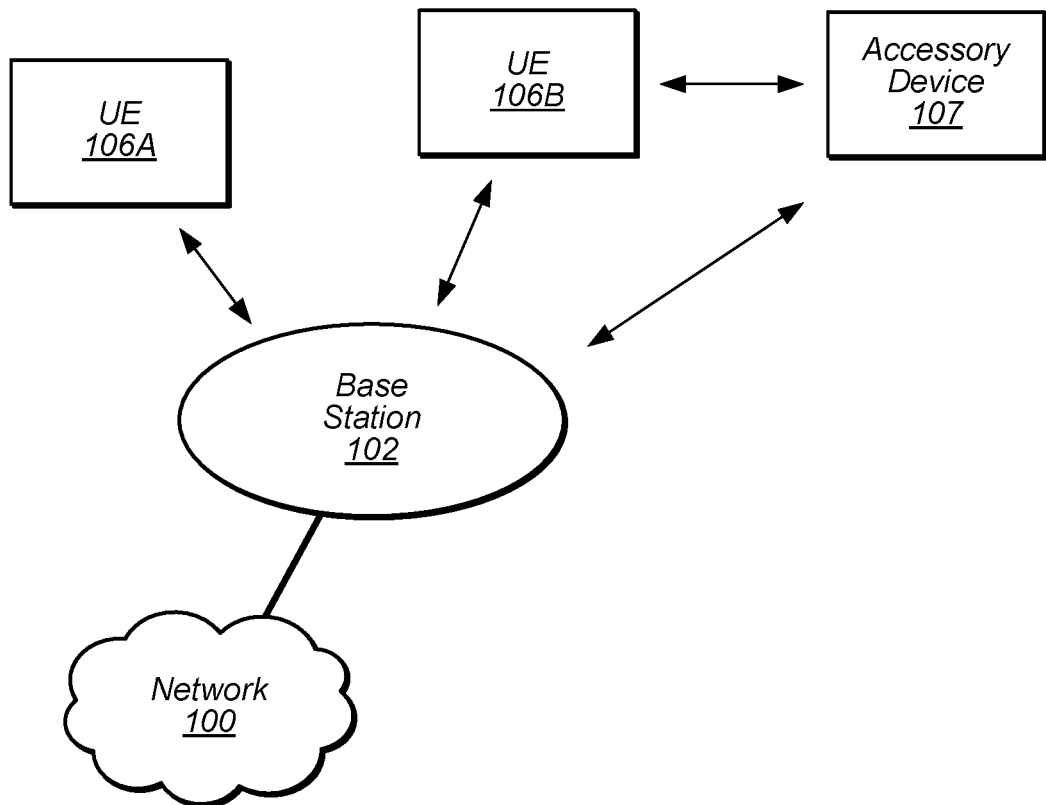
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

Figure 2:
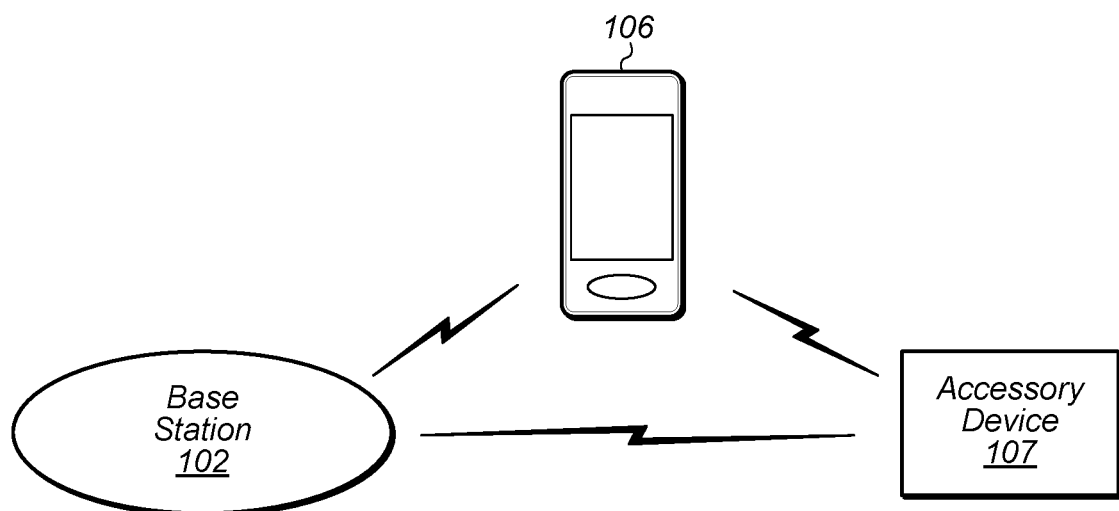
FIG. 2 illustrates an example system where an accessory device can selectively either directly communicate with a cellular base station or utilize the cellular capabilities of an intermediate or proxy device such as a smart phone, according to some embodiments.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processing elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited or no cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
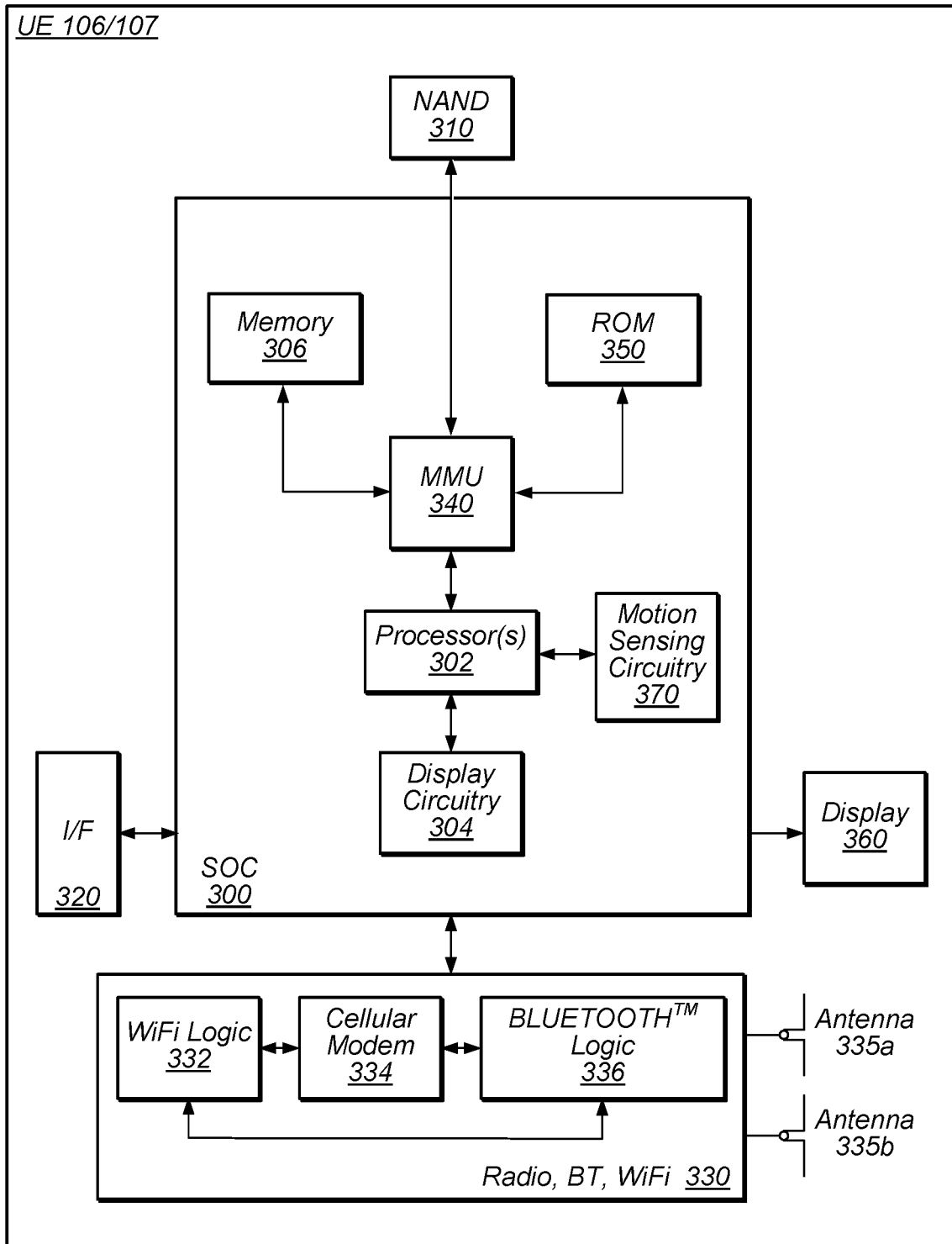
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
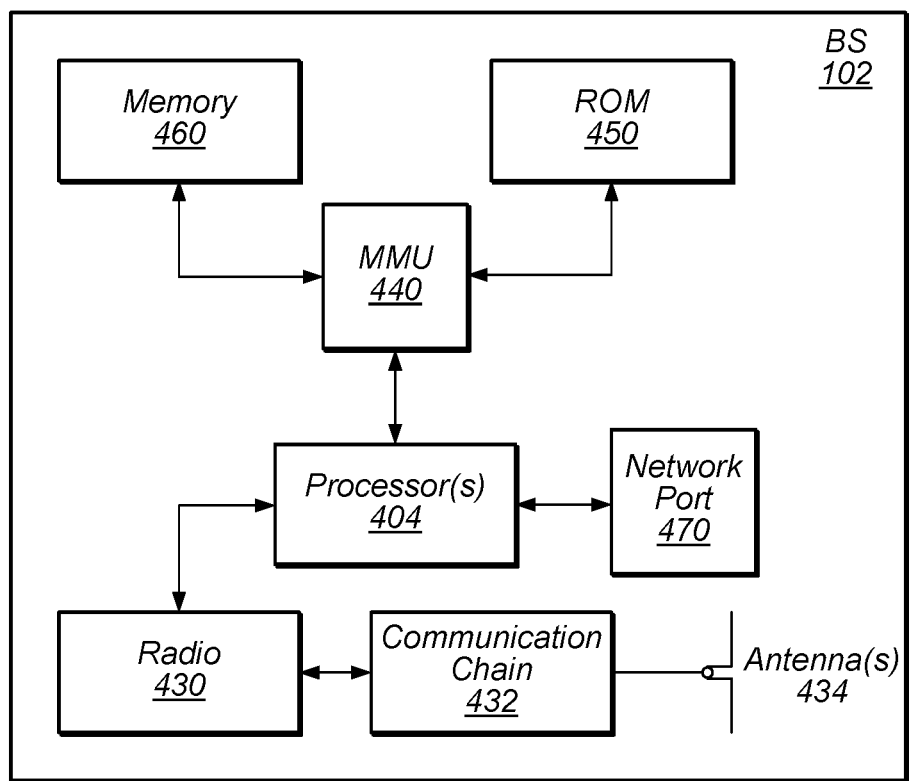
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
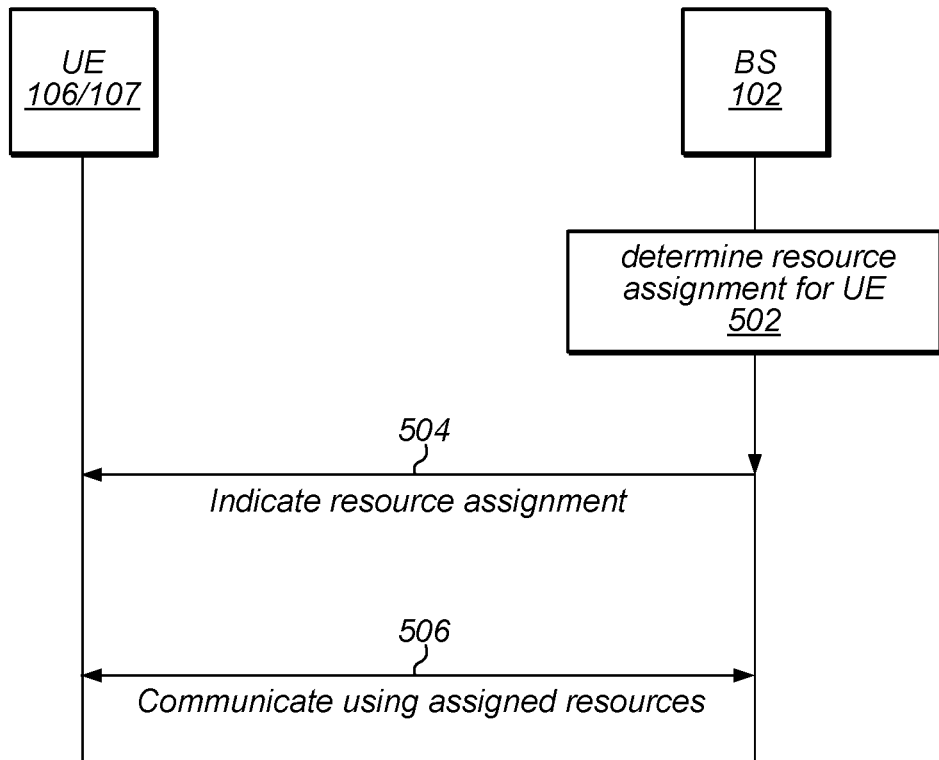
FIG. 5 is a communication flow diagram illustrating an exemplary method for providing robust downlink control information with flexible resource assignments, according to some embodiments.

FIG. 5—Communication Flow Diagram

As cellular communication technologies evolve, an increasing number of cellular communication capable devices are expected to be deployed. This may in turn require a potentially significant increase in support for connected devices per unit area.

Further, one of the reasons for the continuing increase in the numbers of devices includes the development and spread of devices performing machine type communication (MTC). Such devices, which may include stationary deployed devices, wearable devices, and/or other devices forming part of the "Internet of Things", may commonly be designed to perform frequent and/or periodic small data transmissions. A substantial number of these (and other) devices capable of performing cellular communication may be classified as "stationary" (e.g., indicating that the device may be deployed in a stationary location) or "nomadic" (e.g., indicating that the device may be moved between locations, but may generally be stationary once deployed in a location) with respect to mobility.

In view of the potentially more limited expected usage scenarios for such devices, devices primarily expected to perform MTC may commonly be lower-complexity devices than many other common cellular devices (e.g., handheld cellular phones, etc.), for example to reduce the size, cost of manufacture, and/or cost to the consumer of such devices. Accordingly, in many instances the communication capability (e.g., number and/or power level of antennas, battery capability, communication range, etc.) of such devices may be relatively limited. For example, many such devices may be considered link budget limited devices.

This may present difficulties in a wireless communication system primarily configured to support wireless devices with greater communication capability. Accordingly, at least some wireless communication technologies are being revised and/or developed in a manner to support link budget limited devices (e.g., in addition to those wireless devices that are not link budget limited).

One aspect of wireless communication systems with respect to which it may be important to provide support to link budget limited devices may include signaling of resource allocations for downlink and uplink communications. For example, it would be useful to be able to provide and indicate resource allocations of variable sizes to wireless devices, in a robust manner such that those resource allocations can be successfully received and decoded by link budget limited wireless devices that are utilizing coverage enhancing features.

Accordingly, FIG. 5 is a communication flow diagram illustrating such a method for providing robust downlink control information with flexible resource assignments, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as a UE 106 or 107 illustrated in and described with respect to FIGS. 1-3 and/or a base station 102 such as illustrated in and described with respect to FIGS. 1, 2, and 4, or more generally in conjunction with any of the computer systems or devices shown in the above Figures, among other devices, as desired. Note that while at least some elements of the method of FIG. 5 are described in a manner relating to the use of communication techniques and/or features associated with LTE and/or 3GPP specification documents, such description is not intended to be limiting to the disclosure, and aspects of the method of FIG. 5 may be used in any suitable wireless communication system, as desired. As shown, the method may operate as follows.

In 502, a base station 102 may determine a resource assignment for a UE device 106/107. The resource assignment may be a downlink resource assignment (e.g., an assignment of resources designated for use for a downlink communication of data from the BS 102 to the UE device 106/107) or an uplink resource assignment (e.g., an assignment of resources designated for use for an uplink communication of data from the UE device 106/107 to the BS 102).

The resource assignment may include a number of physical resource blocks (PRBs) selected from among the PRBs associated with the system bandwidth on which the BS 102 operates. For example, LTE communication systems may have a variety of possible system bandwidths, such as 1.4 MHz, 3 MHz, 5 MHz, 10 MHz, 15 MHz, 20 MHz, etc, with a corresponding variety of numbers of PRBs available.

According to some embodiments, the system bandwidth may be divided into a number of "narrowbands". Each such narrowband may represent a subset of the system bandwidth on which the BS 102 operates. For example, according to some embodiments, each narrowband may include six PRBs that are contiguous in frequency, and the system bandwidth may be divided into a number of indexed narrowbands. Other numbers of PRBs in a narrowband are also possible. Further, other frequency resource denominations (e.g., in addition or alternatively to physical resource blocks and/or narrowbands) are also possible.

At least according to some embodiments, determination of the resource assignment may be based at least in part on capability signaling exchanged between the base station 102 and the UE 106/107. As one possibility, the UE 106/107 may provide an indication of its RF bandwidth capability for one or more of uplink or downlink communications, according to some embodiments. The base station 102, in turn, may select a resource assignment that does not exceed the RF bandwidth capabilities of the UE 106/107. As another possibility, the UE 106/107 may provide an indication of whether it supports one or more downlink control information formats. For example, some (e.g., legacy) devices might not support a robust downlink control information format capable of indicating flexible resource assignments, in which case the base station 102 might select a resource assignment for the UE 106/107 that can be signaled to the UE 106/107 using a downlink control information format that is supported by the UE 106/107. For a device that does support a robust downlink control information format capable of indicating flexible resource assignments, in contrast, the base station 102 might be able to select a resource assignment with a bandwidth allocation that may be variable, e.g., to the degree supported by the robust downlink control information format capable of indicating flexible resource assignments.

In 504, the BS 102 may indicate the resource assignment to the UE 106/107. For example, the BS 102 may transmit downlink control information (DCI) to the UE 106/107 in a downlink control channel such as a MTC physical downlink control channel (MPDCCH) or another downlink control channel. At least according to some embodiments, the downlink control channel may provide features intended to increase the robustness of the transmission, such as including some level of repetition in time (e.g., over multiple slots or subframes) and/or frequency (e.g., over multiple subcarriers within a symbol, slot, or subframe), among various possibilities.

As one possibility, indicating the resource assignment may include providing an indication of a ("first") narrowband in which the starting PRB of the resource assignment is located, an indication of which PRB within that narrowband is the starting PRB of the resource assignment, and an indication of a number of consecutive PRBs within that narrowband that are included in the resource assignment. According to some embodiments, the starting PRB and the number of PRBs may be indicated using a resource indication value, or "RIV", for example that may be defined in specification documents as indicating a specific starting PRB and number of consecutive PRBs.

In addition, at least according to some embodiments, an additional field may be provided to indicate whether the resource assignment includes any additional narrowbands, e.g., to increase the flexibility of the amount of resources allocated. For example, a one bit field may be used to indicate whether 0 or 1 additional narrowbands are included in the resource assignment, or a two bit field may be used to indicate whether 0, 1, 2, or 3 additional narrowbands are included in the resource assignment. Thus, in a system with narrowbands that include 6 PRBs and a two bit field for indicating additional narrowbands included in a resource assignment, it could be possible to indicate a resource allocation having any desired number of PRBs from 1-24 PRBs. As will be recognized by those of skill in the art, any number of other resource allocation ranges are also possible, e.g., for systems having different parameters within such a framework.

If the indication of the resource assignment indicates that any additional narrowbands are included in the resource assignment, such additional narrowbands may increase the resource assignment by the number of PRBs indicated following consecutively (e.g., according to the PRB index values within the system bandwidth) from the indicated starting PRB and the number of PRBs indicated within the first narrowband, at least according to some embodiments. Depending on the system bandwidth and the starting PRB of the resource assignment, it may be possible for the number of PRBs to be constrained by availability of narrowbands/PRBs in the system, e.g., even if the resource assignment indicates that a greater number of PRBs are provided.

Alternatively, any number of other mechanisms for signaling a variable resource assignment (e.g., including a variable amount of contiguous bandwidth) may be used, if desired. For example, an indication of a starting PRB and a total number of PRBs allocated may be used, as one possibility. As another possibility, one or more additional or alternative denominations of frequency resources may be defined (e.g., "widebands" including 24 or some other number of PRBs, as one possibility), such that a base station could provide an indication of an amount of frequency resources that are included in the resource allocation by indicating a denomination of frequency resources (e.g., whether a resource allocation includes an allocation of a narrowband or an allocation of a wideband).

Note that in many communication systems, certain resources (e.g., PRBs and/or resource elements within certain PRBs) distributed through the system bandwidth may be reserved for other purposes (e.g., control channels, reference signals, etc.). In case a resource assignment encompasses some such resources, those resources may not be included as part of the resource assignment, but may remain available for their reserved purposes, at least according to some embodiments.

Note also that the resource assignment may be for a subsequent subframe (e.g., a subframe subsequent to a subframe in which an indication of the resource assignment will be transmitted), at least according to some embodiments. Additionally, as previously noted, the BS 102 may transmit one or more repetition of the DCI to the UE 106/107, at least according to some embodiments. Providing the DCI in advance, and providing repetitions of the DCI, may improve the decodability of the DCI at the UE 106/107. For example, the repetitions may allow the UE 106/107 to utilize one or more signal processing techniques to improve the effective signal to noise ratio of the signal containing the DCI, in turn increasing the likelihood that the signal can be correctly decoded to retrieve the information (e.g., including the indication of the resource assignment) contained therein.

In 506, the UE 106/107 and the BS 102 may communicate using the resources allocated in the resource assignment. For example, if the assignment is a downlink resource assignment, the BS 102 may transmit data to the UE 106/107 using the PRBs indicated in the downlink resource assignment. Similarly, if the assignment is an uplink resource assignment, the UE 106/107 may transmit data to the BS 102 using the PRBs indicated in the uplink resource assignment.

Note that part or all of the method of FIG. 5 may be repeated as desired, at least according to some embodiments. For example, the base station 102 may provide further downlink control information at a subsequent time (e.g., which may similarly be transmitted on a downlink control channel having robust/coverage enhancing features such as temporal repetitions, such as a MPDCCH), indicating a further resource assignment. This further resource assignment could be for the same amount of resources or for a different amount of resources than the previous resource assignment, e.g., since the downlink control information format may support indication of such flexible resource assignments. Further, the resource assignment could include the same starting resource (e.g., the same starting PRB) or a different starting resource than the previous resource assignment. The UE 106/107 and the BS 102 may then communicate data (e.g., uplink or downlink data, depending on the type of resource assignment) according to this further resource assignment.

Additional Information

The following additional information is provided as being illustrative of further considerations and possible implementation details of the method of FIG. 5, and is not intended to be limiting to the disclosure as a whole. Numerous variations and alternatives to the details provided herein below are possible and should be considered within the scope of the disclosure.

3GPP REL 13 defined DCI formats 6-xx for devices in bandwidth-reduced low-complexity or battery-life/coverage-enhanced (BL/CE) mode. These DCIs may be carried on the MPDCCH and the allocations may be restricted to 6 PRBs within the RF system bandwidth (examples of LTE RF bandwidths and the number of PRBs in the system may include: 1.4 MHz, 6 PRBs; 3 MHz, 15 PRBs; 5 MHz, 25 PRBs; 10 MHz, 50 PRBs; 15 MHz, 75 PRBs; 20 MHz, 100 PRBs). From the UE perspective, 6 PRBs may fit within a RF bandwidth of 1.4 MHz.

The MPDCCH (e.g., in contrast to the EPDCCH) may utilize repetitions in time to enhance the link budget. The allocations made using DCIs with formats 6-xx in the DL can also have repetitions in time to help the link budget.

The MPDCCH scheme may be suitable, for example, for Category M1 of devices, which have low throughput requirements. However, MPDCCH may also be useful for devices that are in CE modes A or B, among various possibilities.

To accommodate devices that have higher throughput requirements but may need to operate as BL/CE devices when in poor coverage, it would be beneficial to allow resource assignments with greater that 1.4 MHz of RF bandwidth (more than 6 PRBs).

In other words, the techniques described herein may be useful for coverage-constrained/link-budget-limited devices that are operating in a coverage extending mode of operation, and/or more broadly for devices that are not generally link budget limited due to device constraints, but that are operating in coverage extending mode of operation, for example due to current wireless medium conditions.

To accommodate such larger allocations, new DCI formats are proposed herein. Such formats may be referred to herein as 7-0A (e.g., for uplink allocations) and 7-1A (e.g., for downlink allocations), though such formats may alternatively be referred to in any other manner if desired, and may be similar to DCI formats 6-0A and 6-1A used in CE mode A, but may be configured such that allocations or assignments (UL PUSCH and DL PDSCH) larger than 6 PRBs are possible.

According to some embodiments, the DCI Format 7-0A may be used for UL allocations (PUSCH) while the DCI format 7-1A may be used for DL assignment (PDSCH). The two DCIs may have the same size, at least in some instances.

According to some embodiments, the DCI Format 7 may extend DCI Format 6 to allow resource assignments of up to 24 PRBs. Note that, at least in some instances, the DCI format 7-0 may be used only if the number of UL PRBs in the system is greater than 6, and similarly, the DCI format 7-1 may be used only if the number of DL PRBs in the system is greater than 6.

To retain the benefits for the UE to operate in a limited bandwidth in both transmit and receive, the resource assignments may be constrained to a set of contiguous PRBs in a transmission time interval (TTI), if desired. For example, if a maximum of 24 PRBs are allocated/assigned, the UE would need a bandwidth of no more than 5 MHz.

According to some embodiments, DCI format 7-0A may be zero padded so that its size is the same as the size of DCI format 7-1A (e.g., similar to DCI Formats 6). Also similar to DCI Formats 6, the DCI formats 7 may be carried in MPDCCH. Note that the size of DCI format 7 may be greater than the size of DCI format 6, e.g., in order to differentiate between the two when blind decoding on MPDCCH, if desired.

DCI Format 6-0A makes the resource block assignment for a device using two parameters: a narrowband of 6 PRBs, and 5 bits to pick a starting PRB in the narrowband and the number of PRBs. The number of bits required to specify the narrowband may thus be $$\left\lceil \log_2 \left\lfloor \frac{N_{RB}^{UL}}{6} \right\rfloor \right\rceil,$$

where $N_{RB}^{UL}$ is the number of PRB's in the uplink system bandwidth.

Note that the narrowbands may be defined in 3GPP TS 36.211 (e.g., at 5.2.4). The PRBs in the chosen narrowband may be specified by a resource indication value (RIV) (e.g., such as defined in 3GPP TS 36.213, 8.1.1) that determines the starting PRB within the narrowband, $RB_{START}$, and number of consecutive PRBs, $L_{CRB}$. For the purpose of RIV calculation, $N_{RB}^{UL}=6$.

Thus, using DCI Format 6-0A (e.g., such as defined in 3GPP 36.212, 5.3.3.1.10) as a template, the DCI 7-0A may be obtained by increasing the number of bits for a resource block assignment by up to 2 bits. This 1 or 2 bit field may be referred to as the m-field, with m referring to the value given by the new field, and m referring to the number of bits in the new field. If $N_{RB}^{UL}>12$, two bits (m=2) may be used for m, otherwise one bit (m=1) may be used for m. The m-field may increase the PRB allocation by 6m PRBs. Thus, a maximum of 24 PRBs may be assigned. For example, if desired, the following specification description could be used with respect to DCI format 7-0A for providing an uplink resource block assignment.

Resource block assignment—

$$\left\lceil \log_2 \left\lfloor \frac{N_{RB}^{UL}}{6} \right\rfloor \right\rceil + 5 \text{ bits for } PUSCH + m \text{ bits}$$

$$\left\lceil \log_2 \left\lfloor \frac{N_{RB}^{UL}}{6} \right\rfloor \right\rceil$$

MSB bits provide the narrowband index as defined in section 5.2.4 of 3GPP 36.211.

5 bits provide the resource allocation using UL resource allocation type 0 within the indicated narrowband.

if $N_{RB}^{UL}>12$, m=2 bits provide additional resource blocks in contiguous chunks of 6, starting immediately after the resource allocation above. Thus a maximum of min(24, $N_{RB}^{UL}$) resource blocks can be implied to be allocated.

else m=1 bit provides additional resource blocks in contiguous chunks of 6, starting after the resource allocation above. Thus a maximum of min(12, $N_{RB}^{UL}$) resource blocks can be implied to be allocated.

If the 5-bit field "5 bits for PUSCH" is denoted by RIV, then the number of contiguous PRB's implied by the 'resource block assignment' is $$6m + \left\lfloor \frac{RIV}{6} \right\rfloor + 1,$$

whereas the starting PRB index within the specified narrowband is RIV modulo 6.

Additional restrictions may apply as illustrated by the examples described subsequently herein, at least according to some embodiments.

Similarly, DCI format 7-1A may be based on the 6-1A template [36.212, 5.3.3.1.12]. An additional m bits may be defined in the resource block assignment. A starting narrowband is specified and the assignment within the narrowband may be given by an MV [36.213, 7.1.6.3]. For the purpose of RIV calculation, $N_{RB}^{DL}=6$. An additional 6m consecutive PRB may be assigned starting from the end of the assignment given by the MV. Note that any REs or PRBs within the assignment that are reserved for other purposes may not be used for the PDSCH. As an example, if desired, the following specification description could be used with respect to DCI format 7-1A for providing a downlink resource block assignment.

Resource block assignment—

$$\left\lceil \log_2 \left\lfloor \frac{N_{RB}^{DL}}{6} \right\rfloor \right\rceil + 5 \text{ bits for } PDSCH + m \text{ bits}$$

$$\left\lceil \log_2 \left\lfloor \frac{N_{RB}^{DL}}{6} \right\rfloor \right\rceil$$

MSB bits provide the narrowband index as defined in section 6.2.7 of 3GPP 36.211.

5 bits provide the resource allocation using DL resource allocation type 2 within the indicated narrowband.

if $N_{RB}^{DL}>12$, m=2 bits provide additional resource blocks in contiguous chunks of 6, starting immediately after the resource allocation above. Thus a maximum of min(24, $N_{RB}^{DL}$) resource blocks can be implied to be assigned.

else m=1 bit provides additional resource blocks in contiguous chunks of 6, starting after the resource allocation above. Thus a maximum of min(12, $N_{RB}^{DL}$) resource blocks can be implied to be assigned.

If the 5-bit field "5 bits for PDSCH" is denoted by RIV, then the number of contiguous PRB's implied by the 'resource block assignment' is $$6m + \left\lfloor \frac{RIV}{6} \right\rfloor + 1,$$

whereas the starting PRB index within the specified narrowband is RIV modulo 6.

Additional restrictions may apply as illustrated by the following examples, at least according to some embodiments. Note that while the following examples relate to uplink allocations, similar comments may also or alternatively apply for downlink assignments.

As a first example, suppose $N_{RB}^{UL}=50$, such that the total number of narrowbands in the bandwidth is 8, indexed from 0 to 7. Suppose the DCI resource block assignment specifies narrowband=3 and RIV=10 (e.g., $RB_{START}=4$ and $L_{CRB}=2$, according to 3GPP TS 36.213, Section 8.1.1). According to 3GPP TS 36.211, Section 5.2.4, the narrowband 3 comprises PRB's indexed from 19 to 24. The assigned PRBs, depending on the value of m, may be given in the following table. Note that the narrowband 3 is only partially used in this case

TABLE 1

| m | PRB indices | Number of PRBs | Narrowband index number |
|---|---|---|---|
| "00" | 23-24 | 2 | 3 |
| "01" | 23-30 | 8 | 3, 4 |
| "10" | 23-36 | 14 | 3, 4, 5 |
| "11" | 23-42 | 20 | 3, 4, 5, 6 |

As a second example, suppose $N_{RB}^{UL}=50$, such that the total number of narrowbands in the bandwidth is 8, again indexed from 0-7. Suppose the DCI resource block assignment specifies narrowband=3, $RB_{START}=0$ and $L_{CRB}=2$. The assigned PRBs, depending on the value of m, may be given in the following table. Note that in this example, for m="01", the narrowband 3 is fully used while the narrowband 4 is only partially used. Similarly, for m="10" and m="11", respectively, the narrowbands 5 and 6, respectively, are only partially used.

TABLE 2

| m | PRB indices | Number of PRBs | Narrowband index number |
|---|---|---|---|
| "00" | 19-20 | 2 | 3 |
| "01" | 19-26 | 8 | 3, 4 |
| "10" | 19-32 | 14 | 3, 4, 5 |
| "11" | 19-38 | 20 | 3, 4, 5, 6 |

As a third example, suppose $N_{RB}^{UL}=50$, with the PRBs in the UL system bandwidth indexed from 0 to 49, such that the total number of narrowbands in the bandwidth is 8, again indexed from 0 to 7. Suppose the DCI resource block assignment specifies narrowband=5, $RB_{START}=3$ and $L_{CRB}=3$. The assigned PRBs, depending on the value of m, may be given in the following table. Note that in this example, the number of PRBs is constrained by availability of narrowbands and the space for PUCCH (e.g., PRB 49 may be used for the PUCCH for nPUCCH=1 and PRBs 48-49 may be used for the PUCCH for nPUCCH=2).

TABLE 3

| | | nPUCCH = 1 | | | nPUCCH = 2 | | |
|---|---|---|---|---|---|---|---|
| m | Implied number of PRBs | PRB indices | Actual number of PRBs | Narrowband index number | PRB indices | Actual number of PRBs | Narrowband index number |
| "00" | 3 | 34-36 | 3 | 5 | 34-36 | 3 | 5 |
| "01" | 9 | 34-42 | 9 | 5, 6 | 34-42 | 9 | 5, 6 |
| "10" | 15 | 34-48 | 15 | 5, 6, 7 | 34-47 | 14 | 5, 6, 7 |
| "11" | 21 | 34-48 | 15 | 5, 6, 7 | 34-47 | 14 | 5, 6, 7 |

A frequency hopping flag in DCI 6-0A may be used to indicate that the narrowband in the resource block assignment will hop in a pre-agreed manner (e.g., according to 3GPP 36.211, 5.3.4, as one possibility) for repeated transmissions (in time). Since the resource allocation in DCI 7-0A can span up to four narrow-bands, according to some embodiments a hopping scheme may be performed as follows: Let {n_i0} be the set of indices of the k consecutive narrowbands for the first transmission and let the corresponding hopping narrowbands obtained from the procedure in [3GPP 36.211, 5.3.4] for the i th transmission be {n_i}. Then the narrowbands associated with the i th transmission will be the k consecutive narrowbands in increasing order starting from the index min{n_i}. Note that the number of PRBs allocated in different such transmissions can be different, for example due to the constraints illustrated in the previous examples.

According to some embodiments, the MCS index (I_MCS) for DCI Format 7-0A (e.g., as with 6-0A) may be limited to 4 bits (I_MCS in 0-15 and I_TBS in 0-14, for example according to 3GPP 36.213, Table 8.6.1-2). Thus, according to such embodiments, the maximum uplink transport block size for 24 PRBs may be 7224 bits (e.g., according to 3GPP 36.213, Table 7.1.7.2.1). The maximum DL TBS with 24 PRBs may similarly be 7224 bits, at least according to some embodiments. Note that the TBS may be further limited by UE category, at least in some instances.

Additional RRC level signaling, between the UE and eNodeB, may be required to exchange capabilities such as that the UE supports the new DCI formats 7-0A and 7-1A over MPDCCH, and by implication can operate over a RF bandwidth larger than 1.4 MHz. In some cases, the specification may, for example, allow UEs to indicate capability of supporting only up to 3 MHz RF bandwidth, in which case the DCI formats 7-0A and 7-1A will for example not contain assignments larger than 15 PRBs. Such bandwidth restrictions in CE modes may be declared separately by the UE for UL and DL, at least according to some embodiments.

In the following further exemplary embodiments are provided.

One set of embodiments may include a method for a wireless device, comprising: receiving downlink control information from a base station, wherein the downlink control information comprises an indication of a resource assignment for the wireless device, wherein the indication of the resource assignment comprises an indication of a first narrowband associated with the resource assignment, wherein the indication of the resource assignment further comprises an indication of whether one or more additional narrowbands are associated with the resource assignment; and communicating data with the base station according to the resource assignment.

According to some embodiments, the method further comprises: receiving at least one repetition of the downlink control information, wherein the at least one repetition of the downlink control information is configured to improve decodability of the downlink control information.

Another set of embodiments may include a method for a base station, comprising: determining a resource assignment for a wireless device; transmitting downlink control information to the wireless device, wherein the downlink control information comprises an indication of a resource assignment for the wireless device, wherein the indication of the resource assignment comprises an indication of a first narrowband associated with the resource assignment, wherein the indication of the resource assignment further comprises an indication of whether one or more additional narrowbands are associated with the resource assignment; and communicating data with the wireless device according to the resource assignment.

According to some embodiments, the method further comprises: transmitting at least one repetition of the downlink control information, wherein the at least one repetition of the downlink control information is configured to improve decodability of the downlink control information.

According to some embodiments, the indication of whether one or more additional narrowbands are associated with the resource assignment comprises a two bit field configured to indicate whether 0, 1, 2, or 3 additional narrowbands are associated with the resource assignment.

According to some embodiments, the indication of the resource assignment further comprises an indication of a starting physical resource block in the first narrowband and a number that is used in computing a total number of physical resource blocks that are associated with the resource assignment.

According to some embodiments, the one or more additional narrowbands associated with the resource assignment are allocated such that all physical resource blocks of the resource assignment are contiguous, thus allowing the wireless device to operate in a reduced bandwidth compared to a total system bandwidth provided by the base station.

According to some embodiments, each narrowband comprises six physical resource blocks that are contiguous in frequency.

According to some embodiments, the resource assignment is for a subsequent subframe to a subframe in which the downlink control information is provided.

According to some embodiments, the resource assignment comprises a downlink resource assignment.

According to some embodiments, the resource assignment comprises an uplink resource assignment.

According to some embodiments, the method further comprises exchanging signaling information to indicate one or more of: support for a downlink control information format of the downlink control information; or a RF bandwidth capability of the wireless device for one or more of uplink or downlink communications.

A yet further exemplary set of embodiments may include an apparatus, comprising a processing element configured to cause a device to implement any or all parts of the preceding examples.

Another exemplary set of embodiments may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a device to:
receive downlink control information over a machine type communication (MTC) physical downlink control channel (MPDCCH) from a base station;
wherein the downlink control information includes an indication of an uplink resource assignment for the device, wherein the indication of the uplink resource assignment includes first information indicating a starting physical resource block (PRB) associated with the uplink resource assignment, and second information indicating a number of contiguous PRBs associated with the uplink resource assignment, and where the uplink resource assignment is larger than six PRBs; and
transmit data to the base station according to the uplink resource assignment.

2. The apparatus of claim 1, wherein the MPDCCH is suitable for bandwidth limited and/or coverage enhanced devices.

3. The apparatus of claim 1, wherein the processor is further configured to cause the device to:
receive at least one repetition of the downlink control information; and
decode the downlink control information based in part on the at least one repetition.

4. The apparatus of claim 1, wherein the indication of the uplink resource assignment includes a field indicating that at least one additional narrowband is included in the uplink resource assignment.

5. The apparatus of claim 1, wherein the uplink resource assignment is contiguous in frequency, wherein the uplink resource assignment includes a subset of a total system bandwidth provided by the base station.

6. The apparatus of claim 1, wherein the uplink resource assignment is associated with a first time, wherein the downlink control information includes an indication of a second uplink resource assignment associated with a second time.

7. The apparatus of claim 1, wherein the processor is further configured to cause the device to provide an indication to the base station of support for a downlink control information format.

8. An apparatus, comprising: a processor configured to cause a device to: receive downlink control information over a machine type communication (MTC) physical downlink control channel (MPDCCH) from a base station; wherein the downlink control information comprises an indication of a downlink resource assignment for the device, wherein the indication of the downlink resource assignment includes information indicating a plurality of narrowbands associated with downlink resource assignment, wherein a narrowband is defined as six physical resource blocks (PRBs) that are contiguous in frequency; and receive data from the base station according to the downlink resource assignment.

9. The apparatus of claim 8, wherein the MPDCCH is suitable for bandwidth limited and/or coverage enhanced devices.

10. The apparatus of claim 8, wherein the information includes first information indicating a starting narrowband associated with the downlink resource assignment, and second information indicating one or more additional narrowband associated with the downlink resource assignment.

11. The apparatus of claim 8, wherein the information includes first information indicating a starting physical resource block (PRB) associated with the downlink resource assignment, and second information indicating a number of contiguous PRBs associated with the downlink resource assignment, and wherein the downlink resource assignment is larger than six PRBs.

12. The apparatus of claim 8, wherein the processor is further configured to cause the device to provide an indication to the base station of a RF bandwidth capability of the device for one or more of uplink or downlink communications.

13. The apparatus of claim 8, wherein the device is restricted to 6 PRBs within a system bandwidth in poor coverage.

14. The apparatus of claim 8, wherein the device is a bandwidth-reduced low-complexity device and/or a battery-life and/or coverage-enhanced (BL/CE) mode device.

15. A mobile device comprising: a radio; and a processor coupled to the radio and configured to cause the mobile device to: receive downlink control information over a machine type communication (MTC) physical downlink control channel (MPDCCH) from a base station, wherein the downlink control information comprises an indication of a downlink resource assignment for the device, wherein the indication of the downlink resource assignment includes information indicating a plurality of narrowbands associated with downlink resource assignment, wherein a narrowband is defined as six physical resource blocks (PRBs) that are contiguous in frequency; and receive data from the base station according to the downlink resource assignment.

16. The mobile device of claim 15, wherein the MPDCCH is suitable for bandwidth limited and/or coverage enhanced devices.

17. The mobile device of claim 15, wherein the downlink resource assignment is associated with a first time, wherein the downlink control information includes an indication of a second downlink resource assignment associated with a second time.

18. The mobile device of claim 17, wherein the indication of the second downlink resource assignment includes an indication of whether one or more additional narrowbands are associated with the second downlink resource assignment at the second time.

19. The mobile device of claim 18, wherein the indication of whether one or more additional narrowbands are associated with the second downlink resource assignment at the second time includes a two bit field.

20. The mobile device of claim 15, wherein the indication of the downlink resource assignment further includes an indication of a starting physical resource block in a first narrowband of the plurality of narrowbands and a number that is used in computing a total number of PRBs that are associated with the downlink resource assignment.

* * * * *